(12) United States Patent
Uhlhorn et al.

(10) Patent No.: US 7,975,930 B1
(45) Date of Patent: Jul. 12, 2011

(54) OPTICAL SIGNATURE SYSTEM DESTRUCTION SYSTEMS AND METHODS

(75) Inventors: Brian L. Uhlhorn, St. Paul, MN (US); Howard J. Schantz, Inver Grove Heights, MN (US); Robert J. Monson, St. Paul, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 158 days.

(21) Appl. No.: 12/476,749

(22) Filed: Jun. 2, 2009

Related U.S. Application Data

(63) Continuation-in-part of application No. 12/146,810, filed on Jun. 26, 2008, and a continuation-in-part of application No. 12/146,836, filed on Jun. 26, 2008.

(51) Int. Cl.
*G06K 19/06* (2006.01)
(52) U.S. Cl. ....................................... 235/494; 235/454
(58) Field of Classification Search .................. 235/454, 235/491, 494
See application file for complete search history.

(56) References Cited

U.S. PATENT DOCUMENTS

| | | | |
|---|---|---|---|
| 7,184,622 B2 | 2/2007 | Uhlhorn et al. | |
| 7,353,994 B2 * | 4/2008 | Farrall et al. | 235/454 |
| 2004/0219590 A1 * | 11/2004 | Dickinson et al. | 435/6 |

OTHER PUBLICATIONS

"How CD Burners Work" Internet article by Tom Harris at http://computer.howstuffworks.com/cd-burner.htm/printable.*
"Erasing CDs" section of Internet Article "How CD Burners Work" by Tom Harris Internet archive capture from Apr. 16, 2003 at http://web.archive.org http://web.archive.org/web/20030416024217/http://computer.howstuffworks.com/cd-burner4.htm.*
"How CD Burners Work" Internet article by Tom Harris at http://computer.howstuffworks.com/cd-burner.htm/printable Internet archive capture from Apr. 16, 2003 at http://web.archive.org.*
U.S. Appl. No. 12/146,810, filed Jun. 26, 2008.
U.S. Appl. No. 12/146,836, filed Jun. 26, 2008.

* cited by examiner

*Primary Examiner* — Daniel A Hess
(74) *Attorney, Agent, or Firm* — Hamre, Schumann, Mueller & Larson, P.C.

(57) ABSTRACT

System and methods are described for irreversibly destroying optical signatures that utilize optical signature defining material, for example discrete objects or fluids, disposed in optical signature chambers to create individual optical signatures that together form an optical signature for the system. By irreversibly destroying the individual optical signatures, unauthorized replication of the system optical signature is prevented ensuring the security of the optical signature and any technology relying upon or tied to the optical signature.

20 Claims, 11 Drawing Sheets

OPTICAL SIGNATURE SYSTEM DESTRUCTION SYSTEMS AND METHODS

PRIOR APPLICATIONS

This application is a Continuation-in-Part of U.S. application Ser. No. 12/146,810 filed on Jun. 26, 2008, and a Continuation-in-Part of U.S. application Ser. No. 12/146,836 filed on Jun. 26, 2008, both of which are incorporated by reference in their entirety.

FIELD

This disclosure relates to optical signatures and systems and methods for destroying the optical signatures.

BACKGROUND

U.S. patent application Ser. Nos. 12/146,810 and 12/146,836 disclose systems and methods useful for creating unique optical signatures. In one described example, a unique optical signature can be created by an optical signature chamber containing a plurality of discrete, non-uniform, randomly disposed objects in relatively fixed but changeable positions with respect to each other that create a unique optical signature when light from a light source is directed through the optical signature chamber. In another described example, an optical signature chamber contains a fluid that creates an optical signature when light is directed through the optical signature chamber.

The unique optical signature can be used in any of a large number of applications including, but not limited to, the construction of an encryption key or uniquely identifying an object such as an electronic device.

In certain applications, particularly high security applications, it is important to prevent unauthorized access to the unique signature in order to prevent duplication or replication of the signature that can, for example, be used to gain unauthorized access to sensitive data or allow unauthorized use of equipment. In the case of current encryption technology, the encryption key is intended to be erased from memory if an unauthorized person tries to access the encryption key. However, this active erasure approach requires active power or a battery source, which is not necessarily always present. Additionally, the erasure timeline of an active erasure approach may be too long for some application environments.

SUMMARY

System and methods are described for irreversibly destroying optical signatures that utilize optical signature defining means, for example discrete objects or fluids, disposed in optical signature chambers to create the optical signatures. By irreversibly destroying the optical signatures, unauthorized replication of the optical signatures is prevented ensuring the security of the optical signature and any technology relying upon or tied to the optical signature.

The optical signature concepts described herein can be used in any of a large number of applications including, but not limited to, the construction of an encryption key or uniquely identifying an object such as an electronic device. Any application that would benefit from using a unique signature could utilize the optical signature concepts described herein, as well as the optical signature destruction concepts described herein.

In the disclosed examples, the destruction of the optical signature is initiated and completed without the application or presence of electrical power. Any destruction method or technique that results in an irreversible destruction of the optical signature can be utilized. For example, the destruction can be gravity dependent whereby the method relies upon gravity to cause the optical signature defining means to exit the optical signature chambers, which irreversibly alters the optical signatures. In another example, the destruction can rely upon manual application of a mechanical force that forces the optical signature defining means from the optical signature chambers, which irreversibly alters the optical signatures. In still another example, the destruction can rely upon a physical alteration of the optical signature defining means, in which case the optical signature defining means can remain in the optical signature chambers but with shifted physical positions or a physical alteration of a material property, such as a change in an optical property.

When electrical power is available, a destruction method that is initiated and/or completed using electrical power can be utilized. In addition, the destruction method can rely upon the application of electrical energy, such as x-rays which are often used to inspect equipment as part of reverse engineering efforts, to cause an irreversible alteration of the optical signature defining means when exposed to the x-rays, thereby irreversibly altering the resulting optical signature.

In one example, an optical signature system comprises a plurality of optical signature chambers, each optical signature chamber defining an interior space containing optical signature defining means that defines an optical signature of the optical signature chamber resulting from light being directed through the optical signature chamber. The system also includes means for irreversibly altering the optical signature defining means of at least one of the optical signature chambers so as to irreversibly alter the optical signature thereof.

In another example, an optical signature system comprises a housing defining a plurality of optical signature chambers, each optical signature chamber having an interior space, a first end and a second end. The first end of each chamber is closed by first barriers, and the second end of each chamber is closed by second barriers. Each optical signature chamber contains optical signature defining material whereby each optical signature chamber defines an optical signature resulting from light being directed through the optical signature chamber. At least one of the first barriers closing the first end of each chamber and the second barriers closing the second end of each chamber are movable or breakable to allow the interior space of each chamber to communicate with ambient space around the housing.

When the barriers are moved or broken, the optical signature defining material can exit the chambers. When the optical signature defining material comprises discrete, non-uniform, randomly disposed objects in relatively fixed but changeable positions with respect to each other, the objects fall out of or are otherwise discharged from the chambers, which destroys the random arrangement of the objects in each chamber, which results in an irreversible destruction of the optical signatures of each chamber. When the optical signature defining material comprises fluids, the fluids flow out of or are otherwise discharged from the chambers, where they can mix together so one does not know which fluid came from which chamber thereby preventing replication of the correct individual optical signatures and preventing replication of the correct arrangement of the individual optical signature of each chamber.

In another example, a method comprises designing an optical signature system having a housing defining a plurality of optical signature chambers, each optical signature chamber containing optical signature defining material whereby each optical signature chamber defines an optical signature resulting from light being directed through the optical signature chamber. The method also includes designing the optical signature system such that the optical signature defining material in the optical signature chambers can be irreversibly altered so as to irreversibly alter the optical signature of each optical signature chamber.

DRAWINGS

DETAILED DESCRIPTION

Figure 1A:
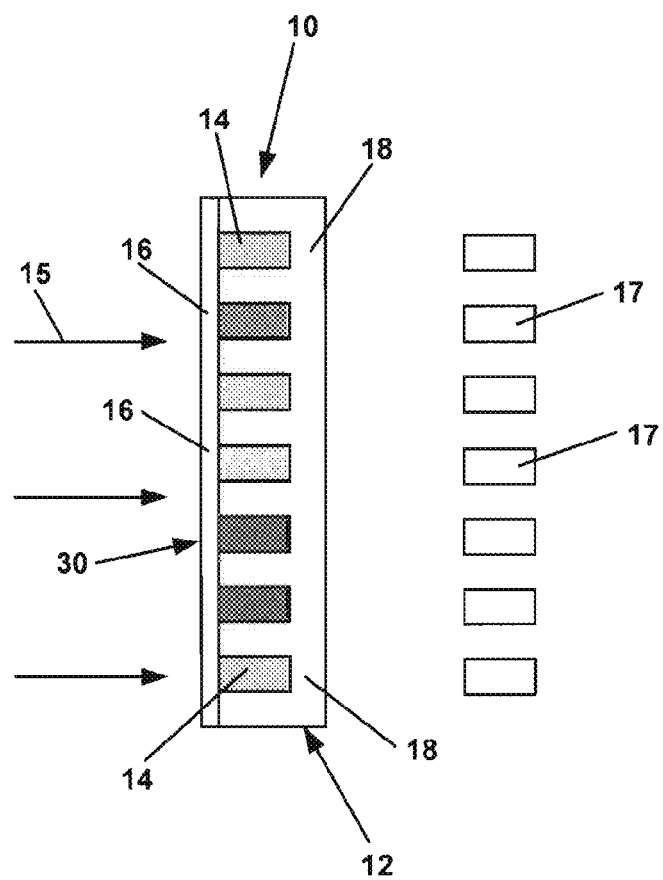
FIG. 1A depicts an optical signature system with an array of optical signature chambers containing fluid.

With reference to FIG. 1A, an optical signature system 10 is illustrated. The system 10 includes a housing 12 defining a plurality of optical signature chambers 14. Each optical signature chamber 14 defines an interior space, a first end and a second end. The first end of each chamber is closed by first barriers 16, and the second end of each chamber is closed by second barriers 18. Each chamber 14 contains a fluid material that forms an optical signature defining means.

Further details on a system with chambers 14 containing fluids for creating an optical signature is described in U.S. application Ser. No. 12/146,836, which is incorporated by reference herein in its entirety.

Figure 1B:
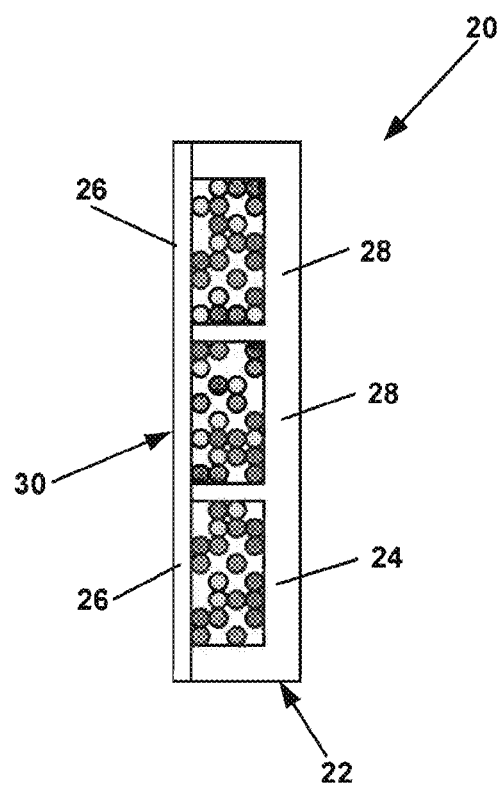
FIG. 1B depicts an optical signature system with an array of optical signature chambers containing discrete objects.

FIG. 1B illustrates an optical signature system 20 that includes a housing 22 defining a plurality of optical signature chambers 24. Each optical signature chamber 24 defines an interior space, a first end and a second end. The first end of each chamber is closed by first barriers 26, and the second end of each chamber is closed by second barriers 28. Each chamber 24 contains a plurality of discrete, non-uniform, randomly disposed objects in relatively fixed but changeable positions with respect to each other that form optical signature defining means.

Further details on a system with chambers 24 containing objects for creating an optical signature is described in U.S. application Ser. No. 12/146,810, which is incorporated by reference herein in its entirety.

The systems 10, 20 generally function as described in U.S. application Ser. Nos. 12/146,836 and 12/146,810. Light from one or more light sources is intended to direct light, represented by the arrows 15 in FIG. 1A, into and through the barriers 16, 26 of the chambers 14, 24. Each chamber creates a unique optical signature as a result of refraction and/or reflection of the light as the light passes through the chambers. The optical signatures can be the resulting pattern of light or portion of the pattern emerging from each chamber 14, 24, the intensity of one or more pixels of light emerging from each chamber, or any other measure of the light emerging from the chambers. One or more light detectors 17 are provided to detect the resulting unique optical signature produced by the chambers 14, 24 as the light emerges from the barriers 18, 28 of the chambers. The detectors may resolve a single point or an array of points and will accept light from at least one optical signature chamber. The detectors can be, for example, a pin diode that produces a single intensity output, or a charge-coupled device (CCD) which receives a relatively wider area of light and produces an array of values as an output, i.e. an image, each relating intensity or color.

As used herein, the optical signature produced by each optical signature chamber will be referred to as an individual optical signature. The individual optical signatures of the chambers together form a resulting unique optical signature for the respective systems 10, 20. In some circumstances, the light waves emerging from the individual optical signature chambers may continue to interact and interfere with each other as they exit the optical chambers, and it is the result of the interfering and interacting light waves that is detected and forms the resulting optical signature of the system.

The number of chambers and the arrangement of the chambers in a pattern or array can vary based on a number of factors, including the particular security application and how many different individual optical signatures need to be created. The chambers are arranged adjacent to one another so as to receive the light from the light source. The chambers can be arranged into a pattern, for example an array of rows and columns, for example x rows and y columns.

When fluid is used as the optical signature defining means, at least two chambers 14 having differing individual optical signatures is required. In the case of randomly disposed objects, only a single chamber 24 is required. The chambers 14, 24 could also contain a mixture of fluid and randomly disposed objects. Likewise, the chambers in each system 10, 20 could comprise chambers containing fluid and chambers containing randomly disposed objects.

For both systems 10, 20, the larger the number of chambers, the more individual optical signatures that are created and in general the more unique the resulting optical signature of the system. However, for the same number of chambers, changing the pattern of the chambers and the locations of the various chambers in the pattern alters the resulting unique optical signature for the entire system.

The barriers 16, 18, 26, 28 are designed to allow passage of light waves into and from the chambers. The barriers can be, for example, made of a material that permits passage of the light, such as clear glass. Alternatively, the barriers can be light transmissive only in the locations where they directly cover the interior spaces of the chambers. The remainder of the housings 12, 22 can also be wholly or partially made of light transmissive material.

The light source(s) and the chambers can be arranged so that the light enters through a longitudinal end of the chambers (for example, through the barriers 16, 26), and exits through an opposite longitudinal end (for example, through the barriers 18, 28). If multiple light sources are used, there can be one light source for each chamber or multiple chambers can share a common light source. The light provided by the light source is preferably visible light, more preferably monochromatic light, for example coherent light from a laser. However, in certain applications, other types of visible light, such as white light, could be used. In addition, non-visible light, for example infra-red light, could be used. Any light source that provides a light wave that can be detected by a suitable optical detector after passing through the signature chamber(s) can be used.

The fluid used has optical properties suitable for producing an individual optical signature. These optical properties can include, for example, indices of refraction, opacity, and wavelength filtering or combinations thereof. In one embodiment, the optical properties of the fluid in the chambers will be different whereby each chamber produces a different individual optical signature. In other embodiments, some of the chambers can contain the same fluid or dissimilar fluids having the same optical properties so that they produce the same individual optical signatures. Nonetheless, not all chambers will produce the same individual optical signature and the chambers will be arranged such that the resulting optical signature for the entire system 10 is unique.

Any of a large number of different kinds of fluids can be used. The fluids can be, for example, optical coupling gels available from Dow Corning Corporation of Midland, Mich. The viscosity of the fluids in the chambers can vary from very viscous fluids such as liquids including water, to less viscous fluids such as gels. In addition, the fluids can be gases having differing optical properties.

The fluid in each chamber can be homogenous or a mix of two or more fluids. In addition, colorant can be added to the fluid to alter the color of the fluid.

The chambers can be completely filled with the fluid so that reorientation of the chambers does not alter the individual optical signatures. In another embodiment, the chambers are only partially filled with fluid. Thus, if the orientation of the chambers is altered sufficiently (for example by tilting the chambers from a vertical orientation shown in FIG. 1A to an angled or horizontal orientation), the fluids shift within the chambers and the individual optical signatures are altered since the light path through the chambers changes.

Further, the fluids used are preferably optically stable so as to maintain their optical characteristics over time. Nonetheless, one or more of the fluids can be designed to optically degrade or change in some manner when exposed to certain operating conditions. For example, the optical properties of one or more of the fluids can be designed to change when the chambers are exposed to certain environmental conditions, such as temperature extremes, or when exposed to x-rays, or when exposed to certain operational conditions, such as vibration or shock extremes.

With respect to the chambers 24, relatively fixed objects means that during normal use the objects retain their positions relative to each other. However, those relative positions are changeable upon the occurrence of an event including, but not limited to, attempted tampering with the chamber(s) or upon application of sufficient force to the chamber(s) that destroys the chamber(s), which thereby alters the resulting optical signature that is created by the chamber(s). For sake of convenience, any event that causes the relative positions of the objects to change will be described herein as a destructive event.

The objects used are preferably discrete from each other during normal use. In other words, the objects are separate or separable from one another although they may be in abutting contact, which facilitates changing of the relative positions. During normal operating condition, the objects can also be described as being separable from each other or non-fusible. Although a number of different words can be used to describe the discrete, separate objects, in one example the objects are intended to spill from the chambers during a destructive event and randomly mix with objects spilled from the other chambers.

The objects in each chamber 24 also have non-uniform or differing optical properties. These optical properties can include, for example, indices of refraction, opacity, and wavelength filtering or combinations thereof. The differing optical properties can be provided in a number of ways, including, but not limited to, using objects of differing sizes, shapes, materials, colors and the like. Thus, the term non-uniform can refer to non-uniformity of the optical properties, or simply non-uniformity in a structural and/or material configuration that results in the non-uniformity of the optical properties. When each chamber is filled with the objects, the resulting non-uniformity of the objects creates the unique signature when the light is passed through the chamber. The objects are preferably solid so that they do not change shape, and thus their optical properties, during normal use.

Further, when the chambers are filled, the objects in each chamber have random positions and orientations within the chamber. However, the chambers are filled such that the positions and orientations of the objects during normal use are maintained. Thus, in one embodiment, the chambers can be completely filled in a tightly packed configuration whereby regardless of the orientation of the chambers (i.e. vertical, horizontal, angled, etc.) the positions and orientations of the objects in the chambers are maintained. In another embodiment, the chambers are only partially filled. Thus, if the orientation of the chambers is altered sufficiently (for example by tilting the chambers from a vertical orientation shown in FIG. 1B to an angled or a horizontal orientation), the positions and/or orientations of the objects can change, thereby altering the resulting optical signatures.

The objects can comprise a number of different forms. In one embodiment, the objects are beads, such as optical beads, made of any suitable material such as glass and having any suitable shape, such as generally spherical. The objects could also be marbles or marble-like objects. Thus, in these two non-limiting examples, the chambers would somewhat resemble jars full of marbles.

Preferably, the objects are non-fusible over normal operating conditions to maintain their separable conditions. The objects are also preferably non-ablative, non-wearing, and have no relative motion with respect to each other during normal operating conditions. Further, the objects are preferably optically stable so as to maintain their optical properties over time. Nonetheless, the objects can be designed to degrade or change in some manner when exposed to certain operating conditions to alter their optical properties. For example, the optical properties of the objects can be designed to change when the chambers are exposed to certain environmental conditions, such as temperature or humidity extremes, or when exposed to x-rays, or operational conditions, such as vibration or shock extremes.

Each system 10, 20 is provided with means for irreversibly altering the optical signature defining means (for example, the objects or the fluid) of at least one of the optical signature chambers so as to irreversibly alter the optical signature thereof, which results in alteration of the optical signature of the system. The alteration can be initiated and completed without the application or presence of electrical power.

The means for irreversibly altering the optical signature defining means can cause alteration either within the chambers themselves whereby the optical signature defining means remain in the chambers, or can cause alteration as a result of the optical signature defining means exiting the chambers, or a combination thereof.

When the optical signature defining means exit the chambers, the exiting can be gravity dependent whereby gravity causes the optical signature defining means to exit the chambers. In another example, the exiting can rely upon manual application of a mechanical force that helps to force the optical signature defining means from the optical signature chambers. When the optical signature defining means remain in the chambers, the alteration can occur by a physical alteration of the optical signature defining means. Physical alterations include, but are not limited to, irreversible alteration of physical positions or locations of the optical signature defining means or a physical alteration of a material property, such as a change in optical property.

Figure 2A:
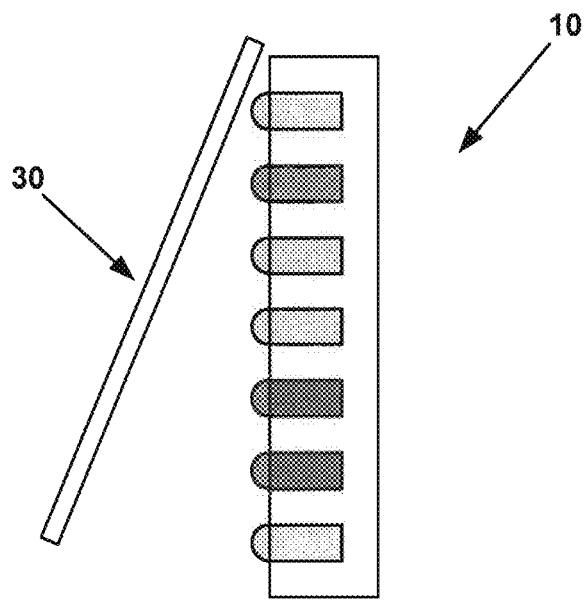
FIG. 2A illustrates the system of FIG. 1A with a lid being opened to initiate destruction.
Figure 2B:
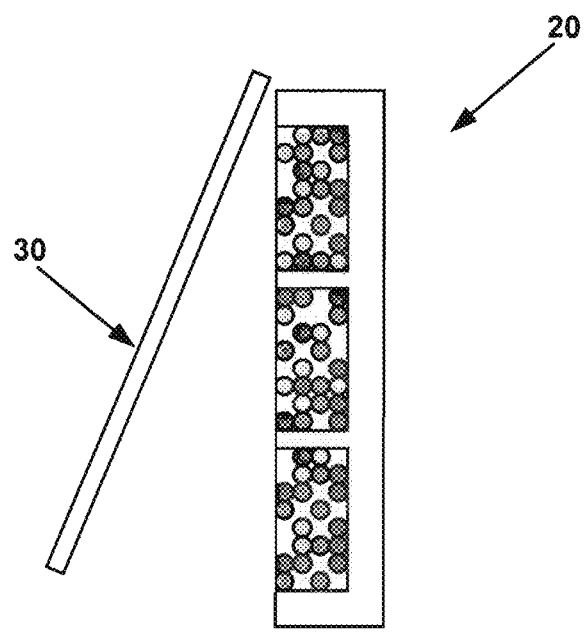
FIG. 2B illustrates the system of FIG. 1B with a lid being opened to initiate destruction.

Returning now to FIGS. 1A and 1B, an example of means for irreversibly altering the optical signature defining means in the form of a gravity dependent mechanism is illustrated. In this example, the barriers 16, 26 are formed by a common structure, in this case a lid 30. The lid 30 is pivotally connected to the housing 12, 22 for movement from a first, closed position (shown in FIGS. 1A and 1B) to a second, open position (shown in FIGS. 2A and 2B) where one end of each chamber is open. The lid 30 can be actuated to the second, open position by a manually actuated lever or other manually actuated mechanical mechanism connected to the lid.

Figure 3A:
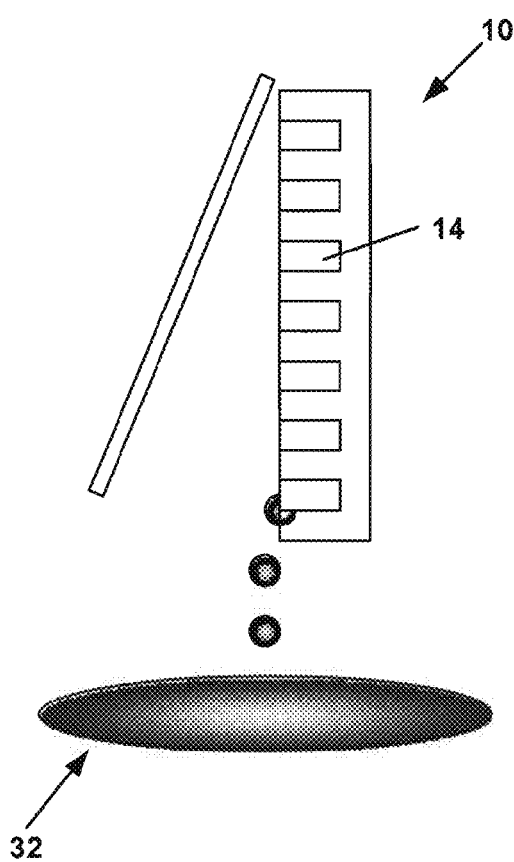
FIG. 3A illustrates the system of FIG. 1A with the fluids spilled from the chambers.
Figure 3B:
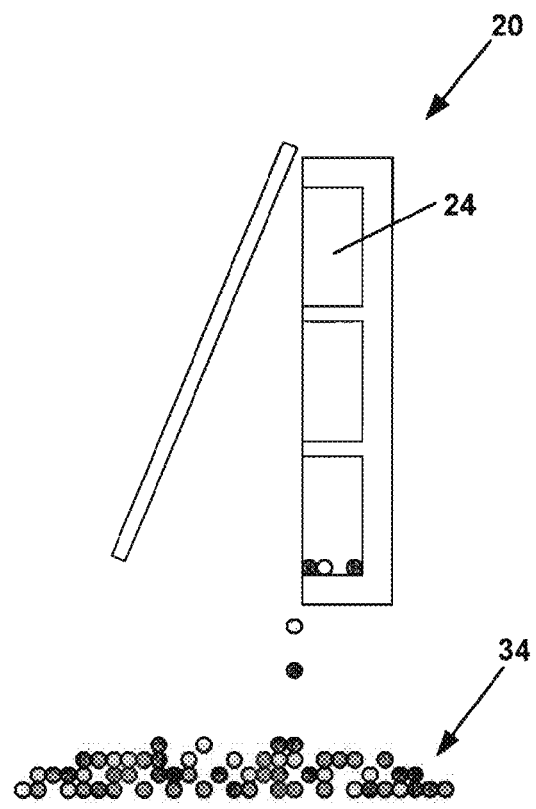
FIG. 3B illustrates the system of FIG. 1B with the objects spilled from the chambers.

When the lid 30 is actuated to the second, open position, the chambers 14, 24 empty as a result of gravity as illustrated in FIGS. 3A and 3B. In the case of the liquids as the fluids, the liquids flow out of the chambers and mix together 32 as shown in FIG. 3A. When this happens, the individual index values of each liquid are lost. Further, with the chambers now substantially empty, it cannot be determined which chamber contained which liquid and how much of each liquid. In the case of discrete objects, the objects fall out of the chambers and can gather into a pile 34 as shown in FIG. 3B. With the chambers empty, it cannot be determined which chamber contained which objects or how the objects were arranged in the chambers.

Figure 4:
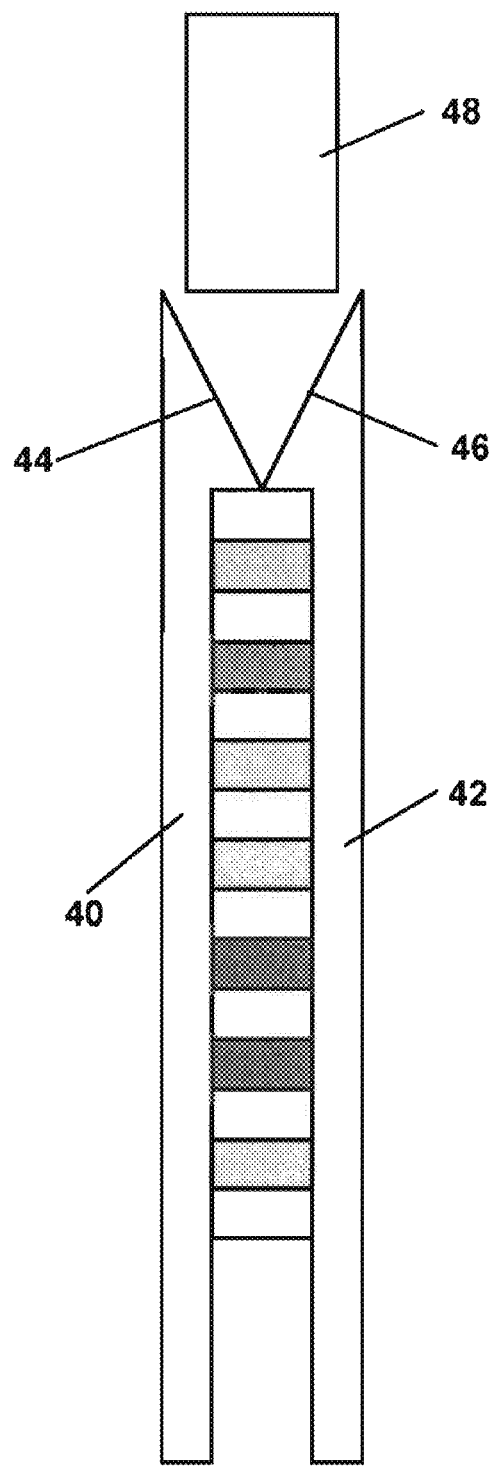
FIG. 4 illustrates an example of a system using two movable lids.
Figure 5:
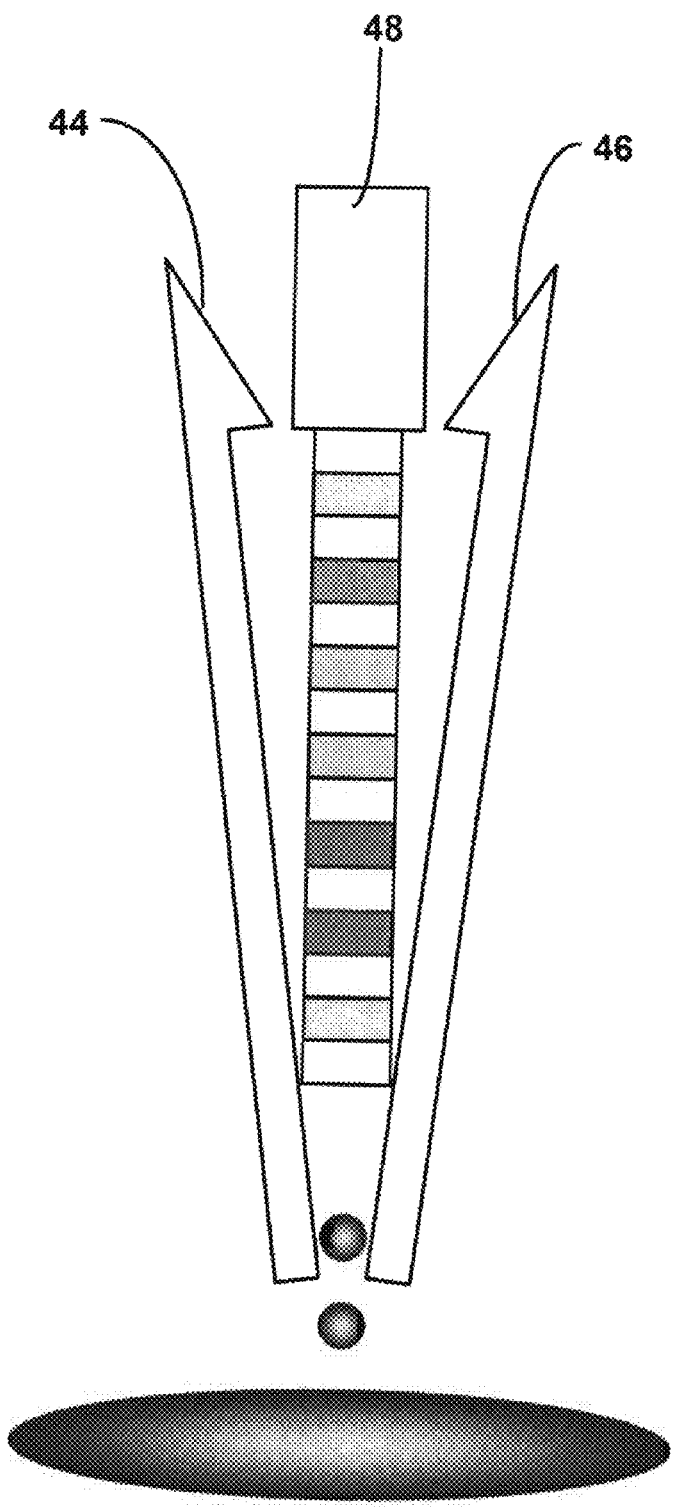
FIG. 5 illustrates the system of FIG. 4 with the lids opened to spill the contents of the chambers.

FIGS. 4 and 5 illustrate another example of means for irreversibly altering the optical signature defining means in the form of a gravity dependent mechanism. In this example, the barriers 16, 18, 26, 28 are formed by first and second lids 40, 42. The lids 40, 42 are pivotally mounted adjacent their bottom ends for movement between first, closed positions (shown in FIG. 4) and second, open positions (shown in FIG. 5). The lids include facing ramp surfaces 44, 46 adjacent their upper ends. A wedge 48 or other member is movably disposed adjacent the upper end and is movable downward into engagement with the ramp surfaces 44, 46. Engagement between the wedge and the ramp surfaces forces the lids 40, 42 to pivot outwardly to the second, open position, uncovering the ends of the chambers and allowing the optical signature defining means to flow or fall out of the chambers. FIGS. 4 and 5 illustrate the optical signature defining means as being fluid, but the optical signature defining means could be discrete objects as well.

Figure 6:
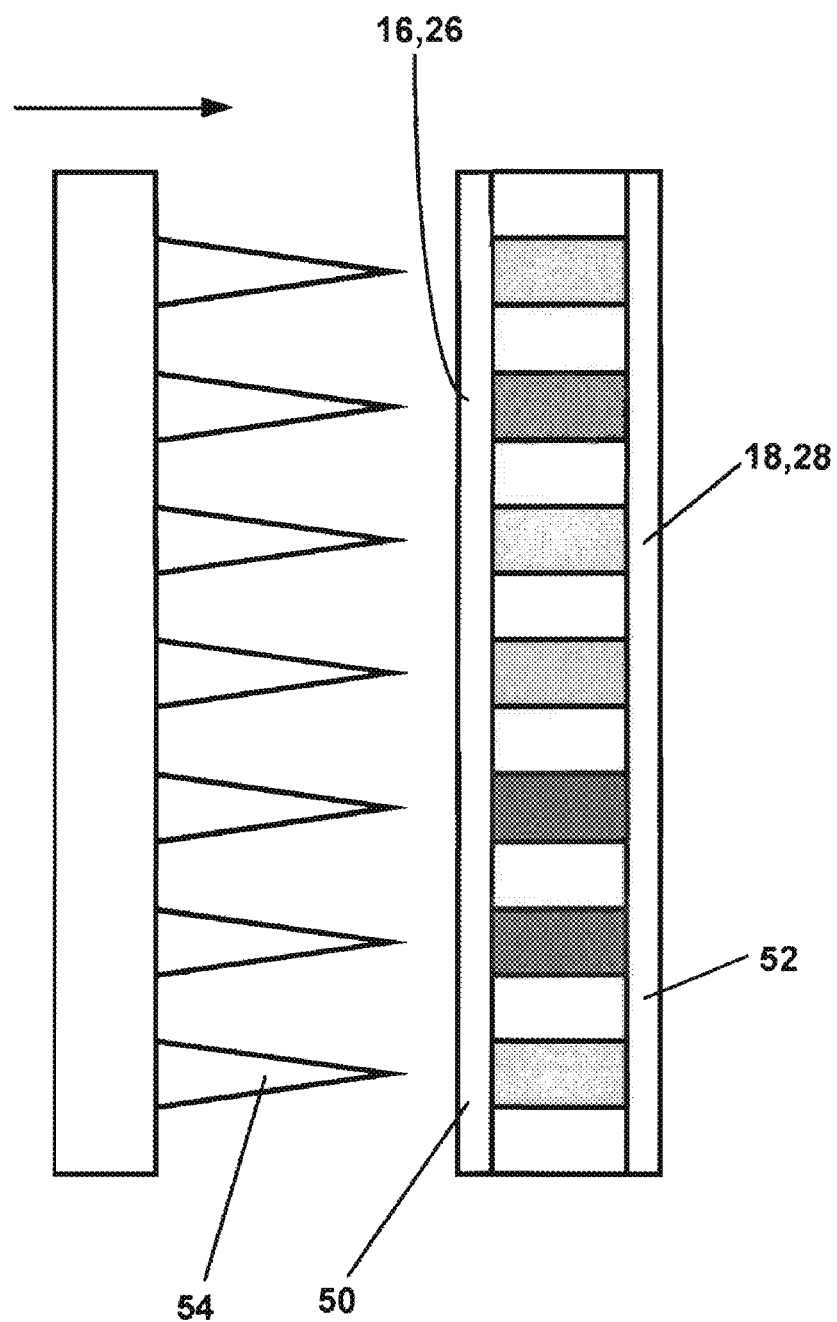
FIG. 6 illustrates an example of a system that utilizes piercing members to mechanically pierce the chambers.
Figure 7:
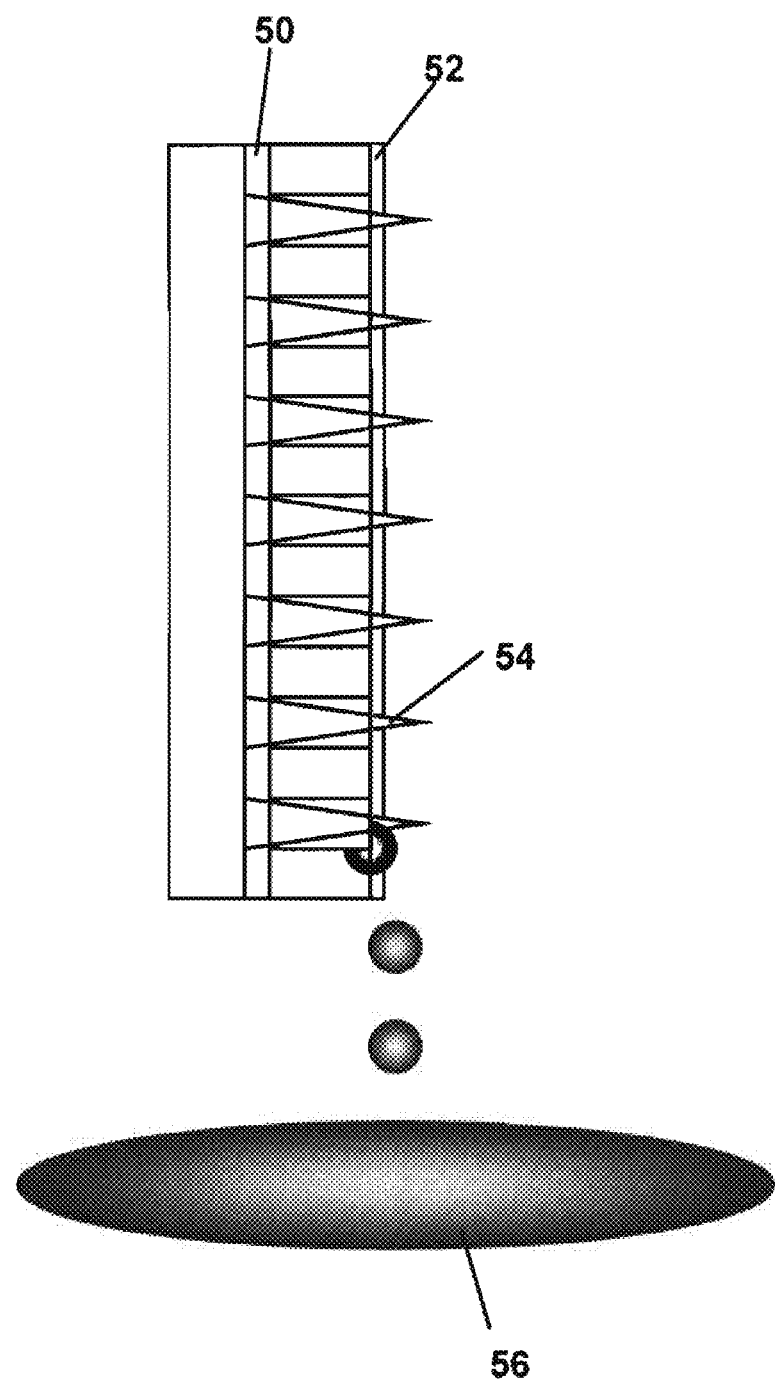
FIG. 7 illustrates the system of FIG. 6 with the piercing members piercing the chambers.

FIGS. 6 and 7 illustrate another example of means for irreversibly altering the optical signature defining means in the form of a mechanical force mechanism that forces the optical signature defining means from the optical signature chambers. In this example, gravity also helps alter the optical signature defining means. The barriers 16, 18, 26, 28 are formed by breakable material 50, 52 that can be pierced by piercing members 54 to mechanically pierce the chambers. The piercing members 54 are disposed to the left in FIG. 6 and are movable to the right to initially pierce the barriers 16, 26, with the piercing members continuing through the chambers to pierce the barriers 18, 28.

As shown in FIG. 7, the piercing members 54 force the optical signature defining means, which in the illustrated example is fluid, from the chambers where the fluid collects in a pool 56. The piercing members can be generally conical shaped, and the chambers can be cylindrical shaped, with the diameter of the piercing members generally equaling the diameter of the chambers at one end, so that the fluid can only flow out from one end of the chamber. The reduction in volume of the chambers caused by the piercing members forces the fluid to flow from the chambers. In addition, gravity will aid the fluid in flowing from the chambers. If the optical signature defining means are discrete objects, the piercing members 54 will force the objects from the chambers.

Figure 8:
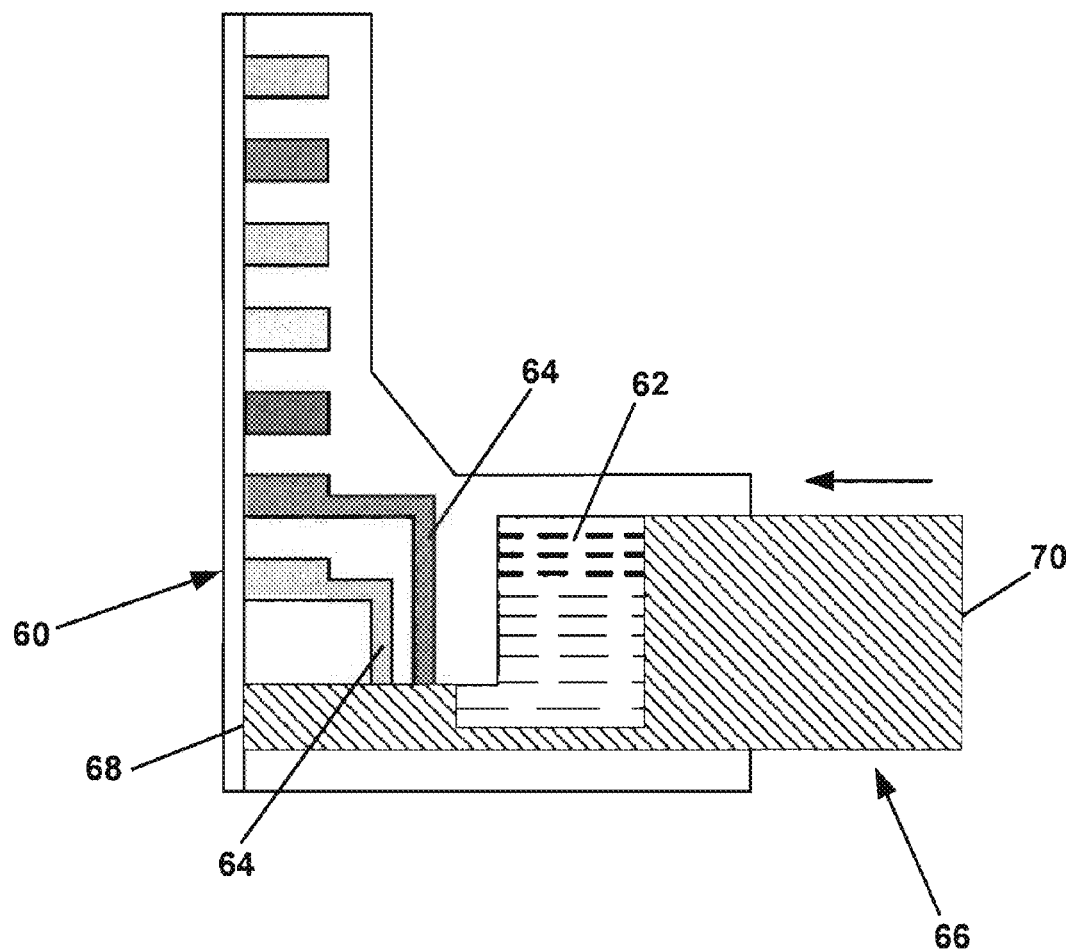
FIG. 8 illustrates a system that utilizes a pump mechanism for applying fluid pressure to a plurality of the chambers.
Figure 9:
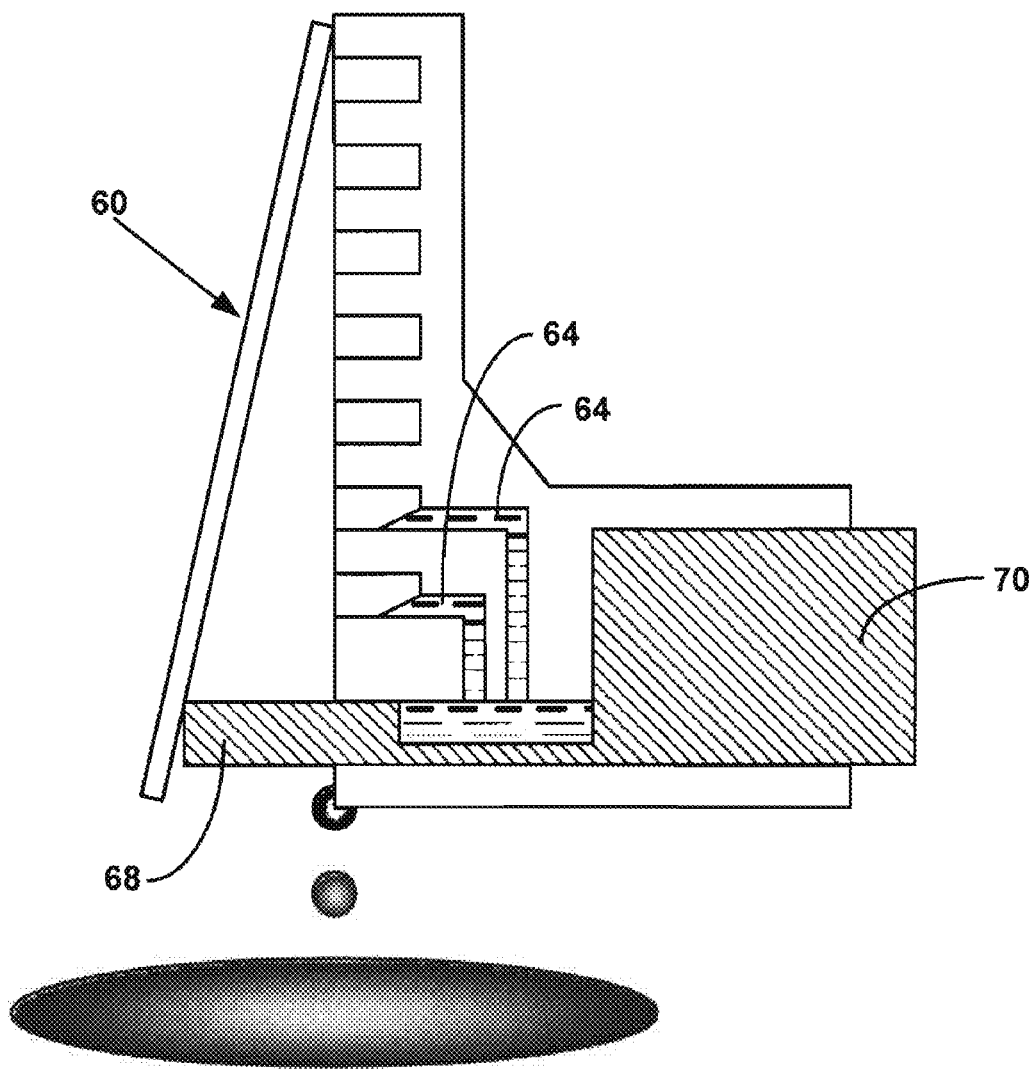
FIG. 9 illustrates the system of FIG. 8 with the pump actuated.

FIGS. 8 and 9 illustrate another example of means for irreversibly altering the optical signature defining means in the form of a pump mechanism for applying fluid pressure to a plurality of the chambers to force the optical signature defining means from the optical signature chambers. In this example, the barriers 16, 26 are formed by a lid 60 that is pivotally connected to the housing for movement from a first, closed position (shown in FIG. 8) to a second, open position (shown in FIG. 9) where one end of each chamber is open. The housing also defines a pump chamber 62 that is filled with, for example, a fluid. Flow channels 64 extend from each chamber 14, 24 to the pump chamber 62. Only two channels 64 are illustrated in FIGS. 8 and 9, it being understood that each chamber could have a flow channel connecting to the pump chamber 62.

A manually actuated piston mechanism 66 is disposed in the pump chamber. The piston mechanism 66 includes a lid engaging end 68 that can project from the housing as shown in FIG. 9 to actuate the lid to the open position. The end 68 also closes off the ends of the flow channels 64 as shown in FIG. 8 to retain the chambers 14, 24 filled with the optical signature defining means, which in the illustrated example is fluid. The piston mechanism 66 also includes a push button end 70 that extends from the housing to be manually actuated by a user.

When a user pushes the push button end 70 in the direction of the arrow, the piston mechanism 66 is moved to the left. The engaging end 68 moves with the push button end 70, pushing the lid to the open position. At the same time, the flow channels 64 are uncovered and the volume of the pump chamber 62 is decreased. The fluid in the pump chamber 62 is thereby forced through the flow channels and into the chambers 14, 24, which forces out the fluid from the chambers as shown in FIG. 9. A similar principle will work when the optical signature defining means are the discrete objects, where the fluid forced from the pump chamber into the chambers 24 will force the objects out of the chambers.

Figure 10:
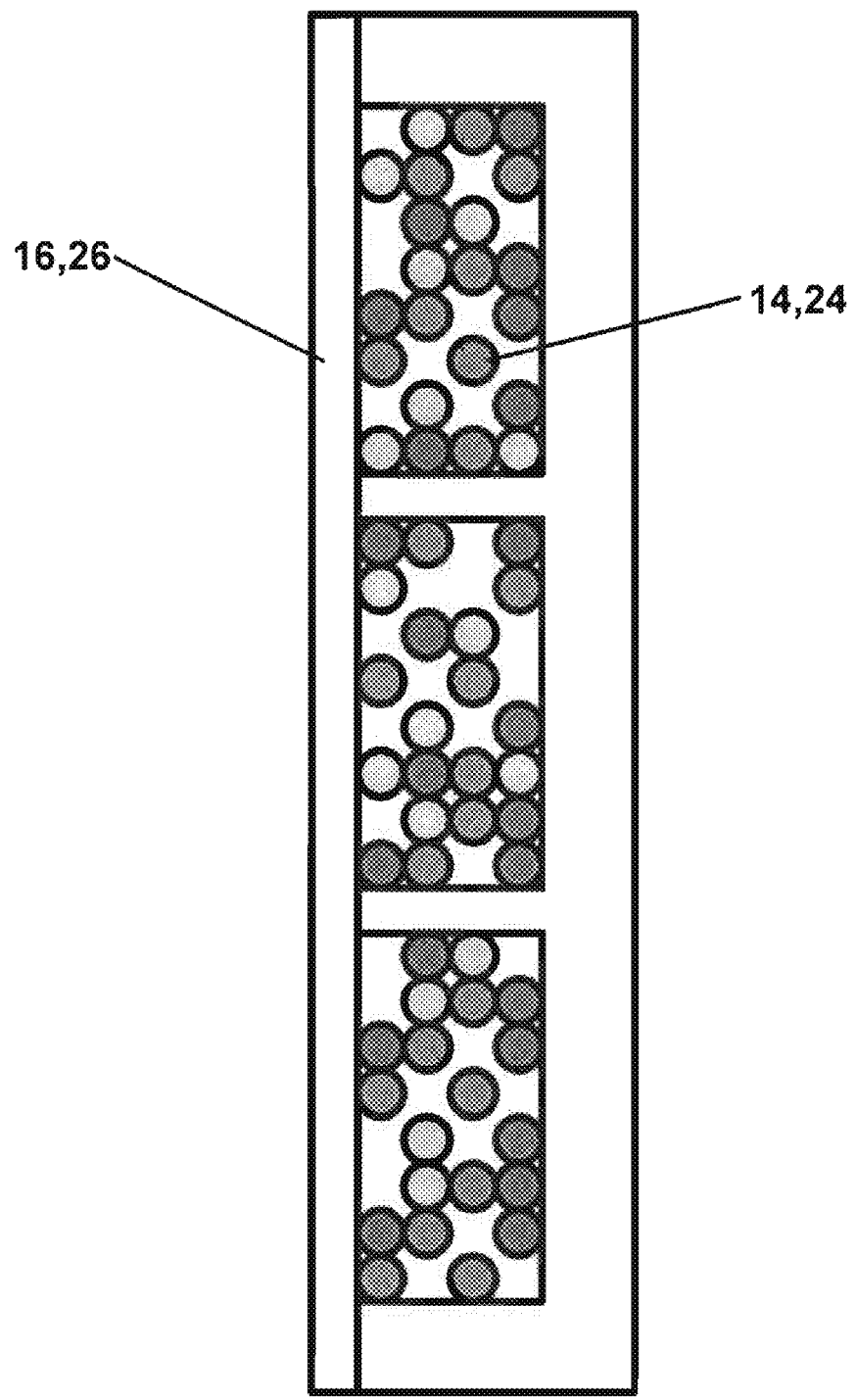
FIG. 10 illustrates a system where the chambers are pressurized.
Figure 11:
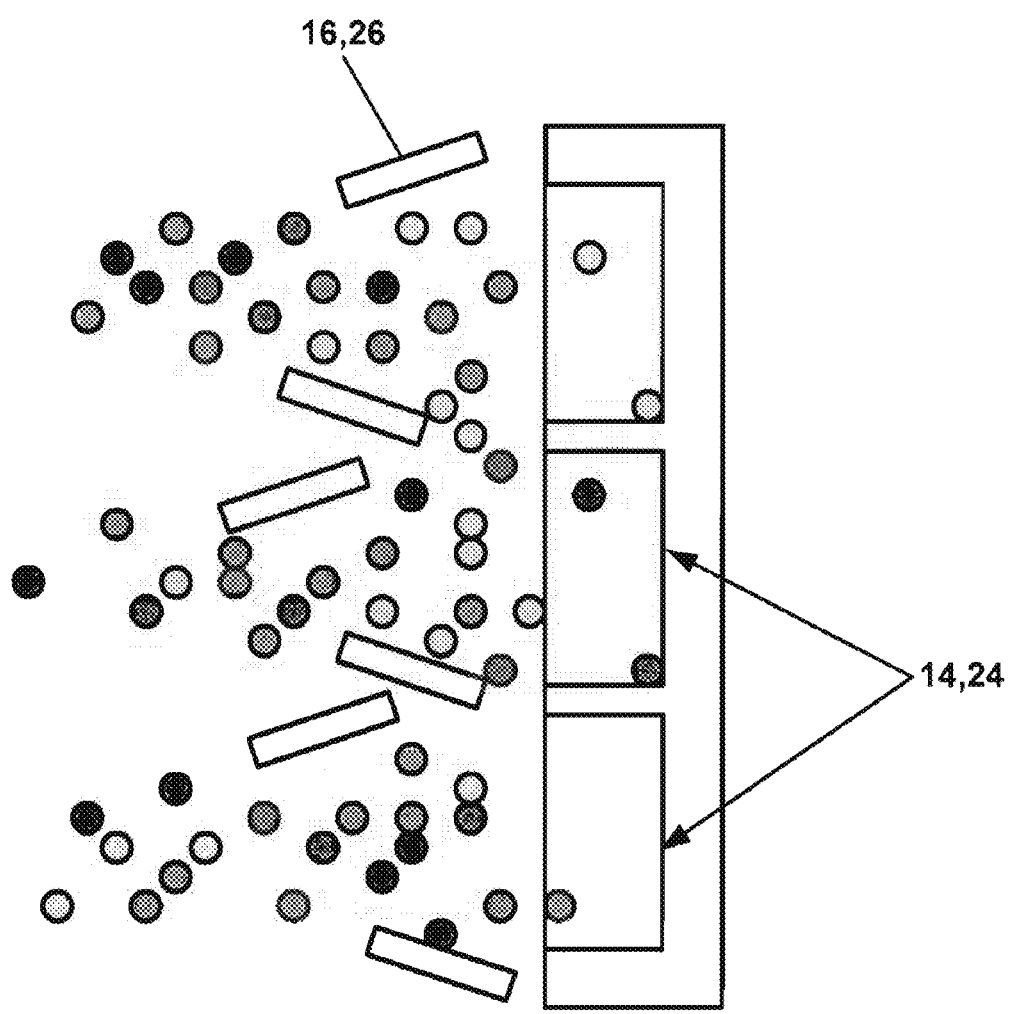
FIG. 11 illustrates the system of FIG. 10 with the walls of the chambers lifted or broken.

FIGS. 10 and 11 illustrate another example of means for irreversibly altering the optical signature defining means in the form of pressurized chambers 14, 24. Each chamber 14, 24 is pressurized, while the area around the housing is at a lower pressure for example atmospheric pressure or at vacuum. Alternatively, the chambers can be kept under vacuum while the area around the housing is at a higher pressure. Any pressure differential between the chambers and the area around the housing that is suitable to result in alteration of the optical signature defining means can be used. The barriers 16, 26 are formed by breakable material, or the barriers can be formed by a movable lid. When the barriers 16, 26 are broken or lifted, the internal pressure of the chambers forces out the optical signature defining means as illustrated in FIG. 11.

In the specific example illustrated herein, fluid or objects can be used as the optical signature defining means. Therefore, for example, illustration of objects in FIGS. 10 and 11 is not intended to limit the concepts disclosed in FIGS. 10 and 11 to be limited to use with objects.

Other means for irreversibly altering the optical signature defining means can be used. The optical signature defining means could be stirred or mixed within the chambers, either by themselves or with added material, so as to alter the optical signature. The optical signature defining means can also be altered if one manually opens the lid 30 or 40, 42 or the lid is somehow physically destroyed. Further, if the housing that forms the chambers is destroyed, the optical signatures would be destroyed. In addition, in the case of optical fluids, a pressurized system can be used to dissolve a gas into the optical fluid, and when the barriers are removed, the fluid outgases or bubbles, changing the optical properties. This embodiment would be useful, for example, when two non-mixing fluids are introduced into the same chamber and the fluids are kept apart by surface tension of the fluids. The outgassing would force some mixture of the fluids, thereby changing the optical properties.

In addition, as discussed above, the optical signature defining means can remain in the chambers, and the alteration can occur by a physical alteration of the optical signature defining means. For example, the optical signature can be altered by changing the orientation of the housing, which causes the optical signature defining means to shift positions. The optical signature defining means can be designed to physically alter when exposed to x-rays. The optical signature defining means can also be exposed to an acid that can be introduced into the chambers to cause alteration of the optical signature defining means thereby resulting in alteration of the optical signature.

The side walls of the chambers may also be breakable or movable such that when broken or moved, the chamber contents mix while the contents remain in the housing.

In the systems described herein, if the optical signature defining means are spilled, forced or otherwise leave the chambers, the optical signatures the chambers are destroyed. Due to the nature of the optical signature defining means and the chambers, one cannot determine which optical signature defining means came from which chamber, in what amounts, nor in what arrangement. Therefore, the optical signature cannot be recreated. Likewise, if the optical signature defining means remain in the chambers, but are physically or positionally altered, the correct optical signature cannot be recreated. If physical or positional alteration does occur, that can be used as an indicator of out-of specification treatment of a device incorporating the described system, which can, for example, void a warranty or act as a "switch" for shutting off an abused device requiring interface with an authorized entity to reset the device.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An optical signature system, comprising:
   a plurality of optical signature chambers, each optical signature chamber includes a housing with side and end walls defining an interior space containing optical signature defining means separate from the housing that defines an optical signature of the optical signature chamber resulting from light being directed through the optical signature chamber, the optical signature defining means being insertable into and removable from their respective housings; and
   means for irreversibly altering the optical signature defining means of at least one of the optical signature chambers so as to irreversibly alter the optical signature thereof.

2. The optical signature system of claim 1, comprising means for irreversibly altering the optical signature defining means of a plurality of the optical signature chambers.

3. The optical signature system of claim 1, wherein the optical signature defining means in each chamber comprises:
   a) a plurality of discrete, non-uniform, randomly disposed objects, the objects loosely rest in one physical arrangement with relative positions between the objects remaining fixed when the objects are not disturbed by a destructive event and the relative positions of the objects are changeable from the one physical arrangement by a destructive event,
   b) a fluid, or
   c) a combination of a) and b).

4. The optical signature system of claim 1, wherein the means for irreversibly altering the optical signature defining means comprises a mechanism that relies on gravity or mechanical force to cause the optical signature defining means to exit the interior space, means for altering an optical property of the optical signature defining means, or combinations thereof.

5. The optical signature system of claim 1, wherein the means for irreversibly altering the optical signature defining means comprises means for altering an optical property of the optical signature defining means while the optical signature defining means remain in the optical signature chambers.

6. The optical signature system of claim 5, wherein the optical property is alterable by temperature, x-rays, acid, vibration or shock.

7. An optical signature system, comprising:
   a plurality of optical signature chambers, each optical signature chamber defining an interior space containing optical signature defining means that defines an optical signature of the optical signature chamber resulting from light being directed through the optical signature chamber; and
   means for irreversibly altering the optical signature defining means of at least one of the optical signature chambers so as to irreversibly alter the optical signature thereof,
   wherein the plurality of optical signature chambers are defined in a housing, the housing includes a movable lid connected thereto that control access to the plurality of optical signature chambers, the lid being movable from a first, closed position to a second, open position; and the means for irreversibly altering the optical signature defining means comprises a mechanism that is engageable with the lid to move the lid from the first, closed position to the second, open position, and the housing is oriented such that the optical signature defining means can exit the respective optical signature chambers under the force of gravity when the lid moves to the second, open position.

8. The optical signature system of claim 7, wherein the housing includes a second movable lid connected thereto that control access to the plurality of optical signature chambers, the second lid being movable from a first, closed position to a second, open position, and the mechanism is engageable with the second lid to move the second lid from the first, closed position to the second, open position.

9. An optical signature system, comprising:
   a plurality of optical signature chambers, each optical signature chamber defining an interior space containing optical signature defining means that defines an optical signature of the optical signature chamber resulting from light being directed through the optical signature chamber; and
   means for irreversibly altering the optical signature defining means of at least one of the optical signature chambers so as to irreversibly alter the optical signature thereof,
   wherein the means for irreversibly altering the optical signature defining means comprises a plurality of piercing members positioned and arranged to mechanically pierce the optical signature chambers, or a pump mechanism for applying fluid pressure to a plurality of the optical signature chambers.

10. An optical signature system, comprising:
    a plurality of optical signature chambers, each optical signature chamber defining an interior space containing optical signature defining means that defines an optical signature of the optical signature chamber resulting from light being directed through the optical signature chamber; and
    means for irreversibly altering the optical signature defining means of at least one of the optical signature chambers so as to irreversibly alter the optical signature thereof,
    wherein the means for irreversibly altering the optical signature defining means comprises maintaining the optical signature chambers at a pressure differential from ambient.

11. An optical signature system, comprising:
    a housing defining a plurality of optical signature chambers, each optical signature chamber having an interior space, a first end, a second end, and a side wall, the first end of each chamber being closed by first barriers, and the second end of each chamber being closed by second barriers;
    each optical signature chamber containing optical signature defining material whereby each optical signature chamber defines an optical signature resulting from light being directed through the optical signature chamber; and
    at least one of the first barriers closing the first end of each chamber, the second barriers closing the second end of each chamber, and the side wall of each chamber are movable or breakable to allow alteration of the optical signature of each chamber.

12. The optical signature system of claim 11, wherein the optical signature defining material in each chamber comprises a plurality of discrete, non-uniform, randomly disposed objects, a fluid, or a combination thereof.

13. The optical signature system of claim 12, wherein the objects are in relatively fixed but changeable positions with respect to each other.

14. The optical signature system of claim 11, wherein the first barriers are defined by a first lid that is movable from a first, closed position to a second, open position; and a mechanism is engageable with the first lid to move the first lid from the first, closed position to the second, open position, and the housing is oriented such that the optical signature defining material can exit the respective optical signature chambers under the force of gravity when the first lid moves to the second, open position.

15. The optical signature system of claim 14, wherein the second barriers are defined by a second lid that is movable from a first, closed position to a second, open position, and the mechanism is engageable with the second lid to move the second lid from the first, closed position to the second, open position.

16. The optical signature system of claim 11, wherein the first barriers and the second barriers are breakable, and including a plurality of piercing members positioned and arranged to mechanically pierce the first barriers and the second barriers.

17. The optical signature system of claim 11, further comprising a pump mechanism that applies fluid pressure to a plurality of the optical signature chambers.

18. The optical signature system of claim 11, wherein a plurality of the optical signature chambers are maintained at a pressure differential from ambient.

19. A method comprising:
    a) designing an optical signature system having a housing defining a plurality of optical signature chambers, each optical signature chamber containing optical signature defining material separate from the housing whereby each optical signature chamber defines an optical signature resulting from light being directed through the optical signature chamber, and the optical signature defining material being insertable into and removable from their respective housings; and
    b) designing the optical signature system such that the optical signature defining material in the optical signature chambers can be irreversibly altered so as to irreversibly alter the optical signature of each optical signature chamber.

20. The method of claim 19, comprising designing the optical signature system to irreversibly alter the optical signature defining material by at least one of altering a position of the optical signature defining material in the optical signature chambers, allowing the optical signature defining material to exit the optical signature chambers, and irreversibly altering an optical property of the optical signature defining material.

* * * * *